(12) United States Patent
Parigger

(10) Patent No.: US 7,032,733 B2
(45) Date of Patent: Apr. 25, 2006

(54) DEVICE AND METHOD FOR ADJUSTING THE TORQUE TRANSMITTED BY A FRICTION CLUTCH

(75) Inventor: Martin Parigger, Eggersdorf (DE)

(73) Assignee: Magna Steyr Powertrain AG & Co. KG, Lannach (AT)

( * ) Notice: Subject to any disclaimer, the term of this patent is extended or adjusted under 35 U.S.C. 154(b) by 57 days.

(21) Appl. No.: 10/490,095

(22) PCT Filed: Sep. 13, 2002

(86) PCT No.: PCT/AT02/00265
§ 371 (c)(1), (2), (4) Date: Mar. 17, 2004

(87) PCT Pub. No.: WO03/025422
PCT Pub. Date: Mar. 27, 2003

(65) Prior Publication Data
US 2004/0238311 A1 Dec. 2, 2004

(30) Foreign Application Priority Data
Sep. 18, 2001 (AT) .............................. GM719/2001

(51) Int. Cl.
F16H 1/00 (2006.01)
F16H 1/14 (2006.01)
(52) U.S. Cl. ................. 192/84.6; 192/84.7; 192/30 W; 701/67
(58) Field of Classification Search ............... 192/84.6, 192/84.7, 30 W; 701/67, 68
See application file for complete search history.

(56) References Cited

U.S. PATENT DOCUMENTS

| | | | | | |
|---|---|---|---|---|---|
| 5,267,635 | A | * | 12/1993 | Peterson et al. | 192/90 |
| 6,003,649 | A | * | 12/1999 | Fischer et al. | 192/3.58 |
| 6,712,189 | B1 | * | 3/2004 | Hirt | 192/84.6 |
| 2003/0029690 | A1 | * | 2/2003 | Reisinger | 192/84.7 |
| 2004/0188218 | A1 | * | 9/2004 | Berger et al. | 192/90 |

* cited by examiner

Primary Examiner—Richard M. Lorence
(74) Attorney, Agent, or Firm—Bachman & LaPointe, P.C.

(57) ABSTRACT

A device for setting the torque transmitted by a friction clutch (12), having an actuator chain which comprises an electric motor (45), a step-down gear (42) and a mechanism for converting the rotational movement into a displacement of a pressure plate (29) of the clutch (12), so as to enable the torque which is transmitted to be set precisely and rapidly even given high friction. For this purpose, the electric motor (45) and/or step-down gear (42) is/are affected by friction, the conversion mechanism (31, 32, 35, 36, 40) and/or the friction clutch (12) itself is/are affected by elasticity, and, to set the torque (Md) of the friction clutch (12), a position regulator (47) which is operatively connected to the electric motor (45) and a sensor (46; 46') which determines the position of one of the links of the actuator chain (45, 42, 41, 40, 36, 35, 32, 31, 29) are provided, the sensor being present at a location upstream of a substantial part of the elasticity in the force-flow direction. The corresponding control and calibrating method is also developed.

10 Claims, 3 Drawing Sheets

DEVICE AND METHOD FOR ADJUSTING THE TORQUE TRANSMITTED BY A FRICTION CLUTCH

BACKGROUND OF THE INVENTION

The invention relates to a device for setting the torque transmitted by a friction clutch, having an actuator chain which comprises an electric motor, a step-down gear and a mechanism for converting the rotational movement into a displacement of a pressure plate of the clutch. Friction clutches having a torque which can be set and transmitted are used, for example, in drive trains of motor vehicles, in particular all-wheel drive motor vehicles, as a differential lock or for switching on an axle drive.

This means not only controlled engagement of the friction clutch but also prolonged operation with the torque set precisely, in accordance with the torque which is to be transmitted. In this case, the torque which is transmitted can be varied continuously by means of a regulating or control device in accordance with dynamic driving requirements. High torques to be transmitted require considerable pressure forces and therefore actuating forces, increased further by the presence of a resetting spring which acts in the opening direction.

In order to produce high and proportionable actuating forces, the torque of the electric motor is intensified by a step-down gear and converted by means of a mechanism into an axial actuating force which acts on the friction clutch. The mechanisms are ramp rings with or without balls, cam disks or other mechanisms.

Friction clutches of the generic type having ramp rings are known, for example from WO 91/12152; WO 01/59331; U.S. Pat. No. 4,976,347 and EP-A-368140. In all of these, the axial force required for transmitting the desired torque is set by activating the electric motor in accordance with one of the customary power control methods (current and/or voltage control, pulse-width modulation, etc.). The interrelationship between required motor current and desired torque of the friction clutch is gathered for this from a characteristic curve. Use is often also made of two different characteristic curves, one when increasing, the other when reducing the torque, in order to take account of the friction hysteresis.

In EP-A-368140, a worm gear affected by friction is used as the step-down gear, and an alternating load is produced in order to overcome the effects of friction hysteresis and in order to reduce the frictional forces in the mechanism. In WO 91/12152 and also in U.S. Pat. No. 4,976,347, spur gears which are low in friction and relatively stiff transmission mechanisms are used as the step-down gear.

The disadvantage of these control methods is that they can only be used if the step-down gear and the mechanism have a low friction hysteresis. Use is therefore made of spur gears, but their step-down is limited. In particular, the characteristic curve for dissipating force has to be clearly situated in the positive region to enable precise setting to be possible at all. Furthermore, the setting accuracy is impaired by the fact that the interrelationship between the torque of the electric motor and the torque transmitted changes, in particular because of:

different frictional conditions in the actuating chain (temperature fluctuations, run-in effects, transition between stiction and sliding friction, and different force of the clutch resetting spring (manufacturing tolerances, clutch clearance).

The interrelationship between the torque of the electric motor and the motor current is also affected by relatively great inaccuracies:

manufacturing tolerances, weakening of field as the temperature of the electric motor rises, irregularities of the torque over the angle of rotation.

For these reasons, in the case of the known systems, the entire actuator chain, from the electric motor up to and including the mechanism, has to be optimized in respect of minimal friction hysteresis, this generally requiring a small step-down and a relatively large motor, but in any case causing additional costs and also having the further disadvantage that, in order to maintain a high transmitted clutch torque, a high motor current always has to be flowing. Since this operational state normally results in a thermal overloading of the motor, an electromagnetically actuated motor brake is necessary, this causing further costs and having a negative effect on the dynamic behavior of the actuator chain, since the brake always has to be released before the adjustment of the torque begins. Although a brake is not required if a step-down gear having a self-locking worm is used, the characteristic curve of said worm for the dissipation of force is situated to such a deep extent in the negative region that it is not suitable for this reason.

It is therefore an object of the invention, avoiding the abovementioned disadvantages, to enable the torque transmitted by a friction clutch to be set precisely and rapidly, even given high friction in the actuator chain, and given fluctuating friction and also such that it is not impaired by other interfering influences.

SUMMARY OF THE INVENTION

The foregoing object is achieved by providing a device according to the invention a) wherein the electric motor and/or step-down gear is/are affected by friction;

b) wherein the conversion mechanism and/or the friction clutch itself is/are affected by elasticity; and c) wherein, to set the torque of the friction clutch, a position regulator which is operatively connected to the electric motor and a sensor which determines the position of one of the links of the actuator chain are provided;

d) for which purpose the sensor is arranged at a location which is situated upstream of a substantial part of the elasticity in the force-flow direction.

The friction clutch is therefore controlled not by controlling the "force" exerted by the electric motor, but rather by an indirect route via a positional control. This indirect route according to the invention, however, eliminates the disadvantages of the known systems; in particular, the friction hysteresis is circumvented. This is because there is an interrelationship, which is particularly suitable for the control, between the position of one of the links of the actuator chain and the actuating force—and therefore the torque transmitted—of the friction clutch, because the mechanical actuator chain and, in particular, the friction clutch itself always have a certain elastic flexibility. By means of this, the characteristic curve also obtains the slope necessary for a precise control.

Since frictional losses occur primarily in the very stiff step-down gear and the elasticities primarily in the part adjacent to it in the force-flow direction, in particular in the friction clutch itself, the interrelationship between the position of one of the links of the actuator chain and the actuating force of the friction clutch is largely independent of the frictional conditions in the stiff links of the actuator chain, in particular in the step-down gear.

It is furthermore also essential that the sensor acts on a link of the actuator chain, which link is situated upstream of a substantial part of the elasticity in the force-flow direction, the intention being that after this link, or the sensor, there will then only be a little amount of friction. This will often be the mechanism for converting the movement. On the basis of this finding, the invention accomplishes the "miracle" of controlling a system which is affected by friction in a manner free from friction hysteresis.

It is therefore also possible, quite consciously and advantageously, to use gear motors having a high internal friction (worm gears, sliding bearings). This favors large step-downs and very small high-speed electric motors, and, in addition to the low cost, also affords the further advantage of it being possible to control and also maintain high clutch torques with a small motor current; in the case of self-locking worm gears—which, owing to the invention, can now advantageously be used—high clutch torques can even be maintained entirely without current.

It has proven very advantageous to arrange the sensor on a shaft of the step-down gear or of the electric motor, and particularly advantageous to provide the sensor as an incremental transmitter on the armature shaft of the electric motor. The angle of rotation of the electric motor can therefore be measured directly. In the case of a very high step-down, the revolutions of the armature shaft could also simply be measured. High step-downs and considerable friction can be realized in the simplest manner using a worm gear. In conjunction with a high-speed motor, this results in very small assembly dimensions.

If the mechanism for converting the movement and the friction clutch itself are too stiff, an advantageous development resides in the structural provision there of additional elasticity. This can be undertaken both by appropriate dimensioning of certain parts and also by fitting a spring in the mechanism or in the friction clutch itself.

The invention furthermore relates to a method for setting the torque transmitted by a friction clutch by means of an actuator chain, comprising an electric motor which displaces via a step-down gear and a mechanism for converting the rotational movement into a displacement a pressure plate of the clutch. In the case of known methods, in order to set the torque which is transmitted, the electric motor is activated in accordance with one of the conventional power control methods, with the disadvantages explained further above.

However, according to the method according to the invention, a desired position of a link of the actuator chain is determined from the torque ($M_{des}$) to be transmitted by the friction clutch and is set by means of a position regulator acting on the electric motor. In this case, use is made of the above-explained finding that the interrelationship between the position of the link and the actuating force of the friction clutch is largely independent of the frictional conditions in the actuator chain if, in the latter, first of all a stiff element affected by friction and then elastic elements are arranged in the force-flow direction, provided that the predominant part of the elastic elements is only downstream of the sensed link. A precise adjustment of the torque which is transmitted is therefore achieved with the disturbing effects of friction hysteresis being eliminated.

It is practical and saves storage space in the associated control unit if the desired position of the link for a torque ($M_{des}$) to be transmitted by the friction clutch is determined with reference to a characteristic curve. In this case, use is made of the fact that this involves a relatively simple characteristic curve of sufficient slope in order to obtain, in a cleanly defined manner, intersecting points with parallels to both coordinate axes. In addition, the slope of this characteristic curve is largely invariable even over a long time.

In one preferred variant of the method, the link is a shaft of the step-down gear or of the electric motor and the desired position is a desired angle of rotation.

In order to set the actual angle of rotation of the electric motor to the desired angle of rotation, use may be made of a classic position regulating method, for example by means of a PID regulator. A regulator of this type reacts to the dynamic conditions in the actuator chain, but only in the indirect route via the regulating variable. However, it is also possible, when setting the actual angle of rotation to the desired angle of rotation, to approach the new position at as high a regulating speed as possible and, given an accompanying calculation of the braking distance, to brake beforehand in good time and to a standstill in the desired position.

In a development of the method according to the invention, the characteristic curve is standardized or calibrated at least when putting the electric motor into operation for the first time. This is desirable because the characteristic curve may diverge due to manufacturing tolerances and may be displaced due to wear, in particular in the direction of the angle of rotation of the motor coordinate axis. This may also be beneficial at certain intervals during the operating service life and then the characteristic curve is recalibrated at certain time intervals. The method of the present invention is particularly simple and nevertheless precise for calibrating the characteristic curve.

The at least one first calibrating point serves to measure the motor current in order to overcome the resetting spring. Since the slope of the characteristic curve is known and is essentially invariable, a first calibrating point is sufficient. At the second calibrating point, resetting forces of the clutch itself are also already occurring; the associated motor current is measured, so that the motor current relevant to the clutch torque is produced. Owing to the fact that the second calibrating point is situated in the region of a small clutch torque, errors have only a slight effect. Offset errors in the current measurement, tolerances of the resetting spring, basic frictions etc. do not have any effect on the accuracy either because they are eliminated by subtraction of the values obtained from the two first calibrating points.

At least one first calibrating point is mentioned because, even in a further calibrating point, the motor current can be measured in order to overcome the resetting spring which has been further compressed. Prior to this procedure, the 0 point of the angle of rotation can be defined from the outset by activating the electric motor in the "open clutch" direction until it reaches a fixed stop.

A refinement of the calibrating method in order to achieve the greatest possible accuracy resides in the fact that the three calibrating points are calibrating intervals over which the motor current is integrated, and then the change in the kinetic energy of the actuator chain in the calibrating interval is subtracted and divided by the width of the interval.

BRIEF DESCRIPTION OF THE DRAWINGS

The invention is described and explained below with reference to figures, in which.

DETAILED DESCRIPTION

Figure 1:
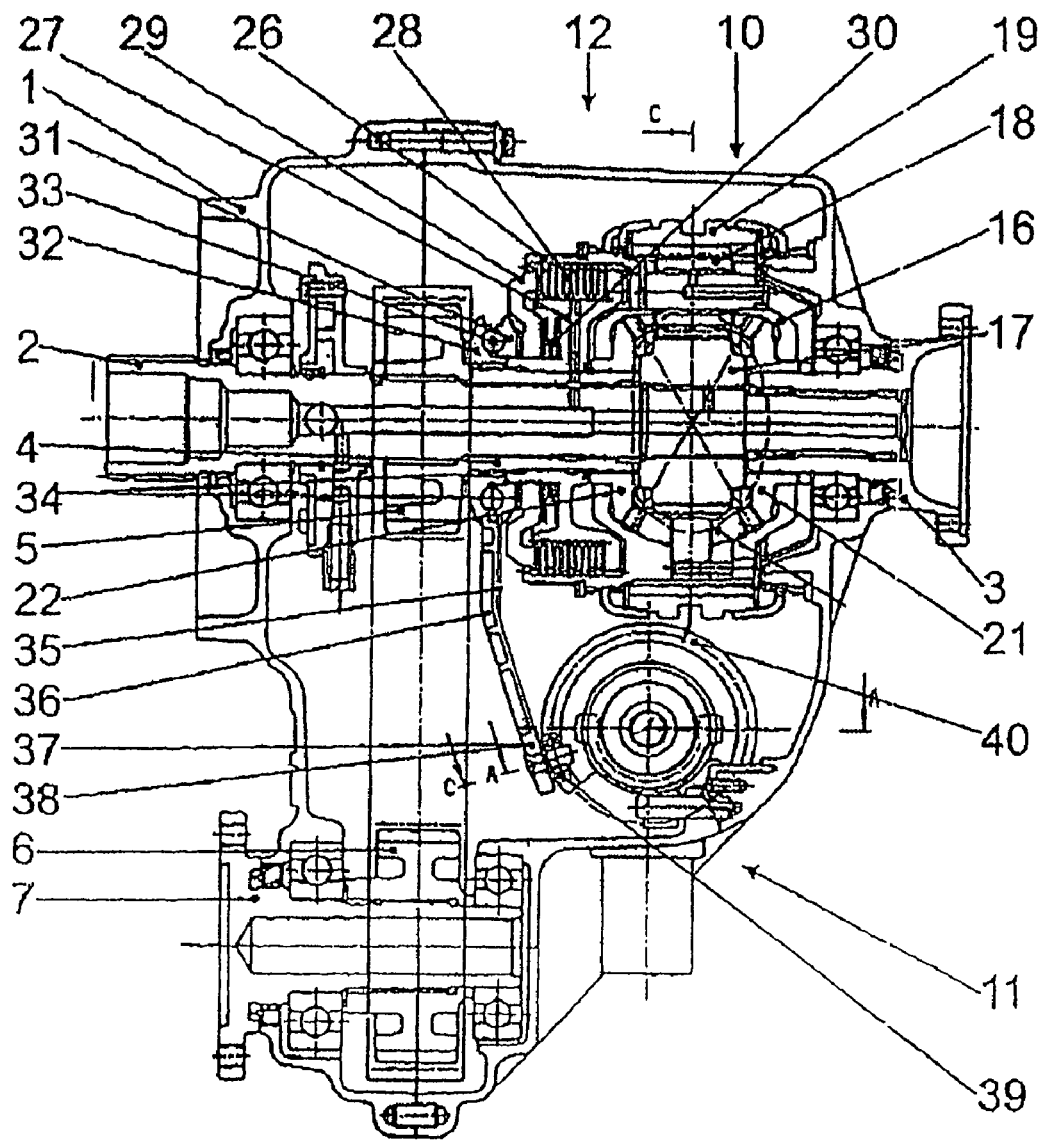
FIG. 1 illustrates a section through an example of using a friction clutch with the device according to the invention.

In FIG. 1, the housing of a transfer gear is referred to overall by 1, an input shaft coming from the drive unit (not illustrated) of the vehicle by 2, a first output shaft drive-connected to the rear axle by 3, and a second output shaft drive-connected to the front axle (likewise not illustrated) by 4. The second output shaft 4 uses a first toothed chain wheel 5 to drive a second toothed chain wheel 6 below the input shaft 2, said second toothed chain wheel sitting on a driven shaft 7 for the drive of the front axle.

To distribute the torque to the two output shafts 3, 4, a differential gear referred to summarily by 10 is provided. Furthermore, a control unit 11 below the differential gear 10 and a locking clutch 12 for locking the differential gear 10 are provided. In the exemplary embodiment shown, the locking clutch is structurally combined with the differential gear 10. However, it could also be separate, even arranged elsewhere in the transfer gear or in the drive train. The differential gear itself may also be designed very differently within the scope of the invention.

In FIG. 1, an exemplary and particular design of the differential gear can also be seen. Situated in the interior of the differential housing 16, which serves here at the same time as a planet carrier, is a sun wheel 17, which is connected in a rotationally fixed manner to the input shaft 2, and situated in the differential housing 16 are rotatably mounted planet wheels 18 of the off-road speed step and also first differential pinions 21 and second differential pinions 22. The former (21) are connected in a rotationally fixed manner to the first output shaft 3 and the latter (22) are connected in a rotationally fixed manner to the second output shaft 4. The differential housing 16 is surrounded by an internal geared wheel 19 which can be displaced axially and is connected during the off-road speed to the differential housing 16 in a rotationally fixed manner.

FIG. 1 also illustrates the locking clutch 12 in detail. It is a friction clutch, and comprises a clutch housing 26, which is connected fixedly to the differential housing 16 or is even integral therewith here, a clutch inner part 27, which is connected in a rotationally fixed manner to the second output shaft 4, a disk assembly 28 and a pressure plate 29, which is acted upon in the opening direction by restoring springs 30. Two rings 31, 32 are arranged between the pressure plate 29 and the second output shaft, here in particular the first toothed chain wheel 5 sitting on said output shaft. Balls 33 are situated in corresponding circumferential grooves between these rings 31, 32. In one of the rings, or in both, these circumferential grooves are designed as ramps, so that during rotation of the two rings relative to each other an axial force is produced by the balls running up the ramp. The two rings 31, 32 are entirely at a standstill if the clutch is not actuated. To decouple them from rotation, the two rings 31, 32 are therefore mounted on needle bearings 34. The first ring 31 has a first ramp lever 35, the second ring 32 has a second ramp lever (36), said ramp levers being connected fixedly to the ring at one end, protruding downward and having rollers 39 at their free ends 37, 38. A rotatable control disk 40 is situated between the two rollers 39. When this control disk is rotated, the rollers 39 are moved apart and the rings 31, 32 are rotated relative to each other via the ramp levers 35, 36, which are moved in the manner of scissors.

Figure 2:
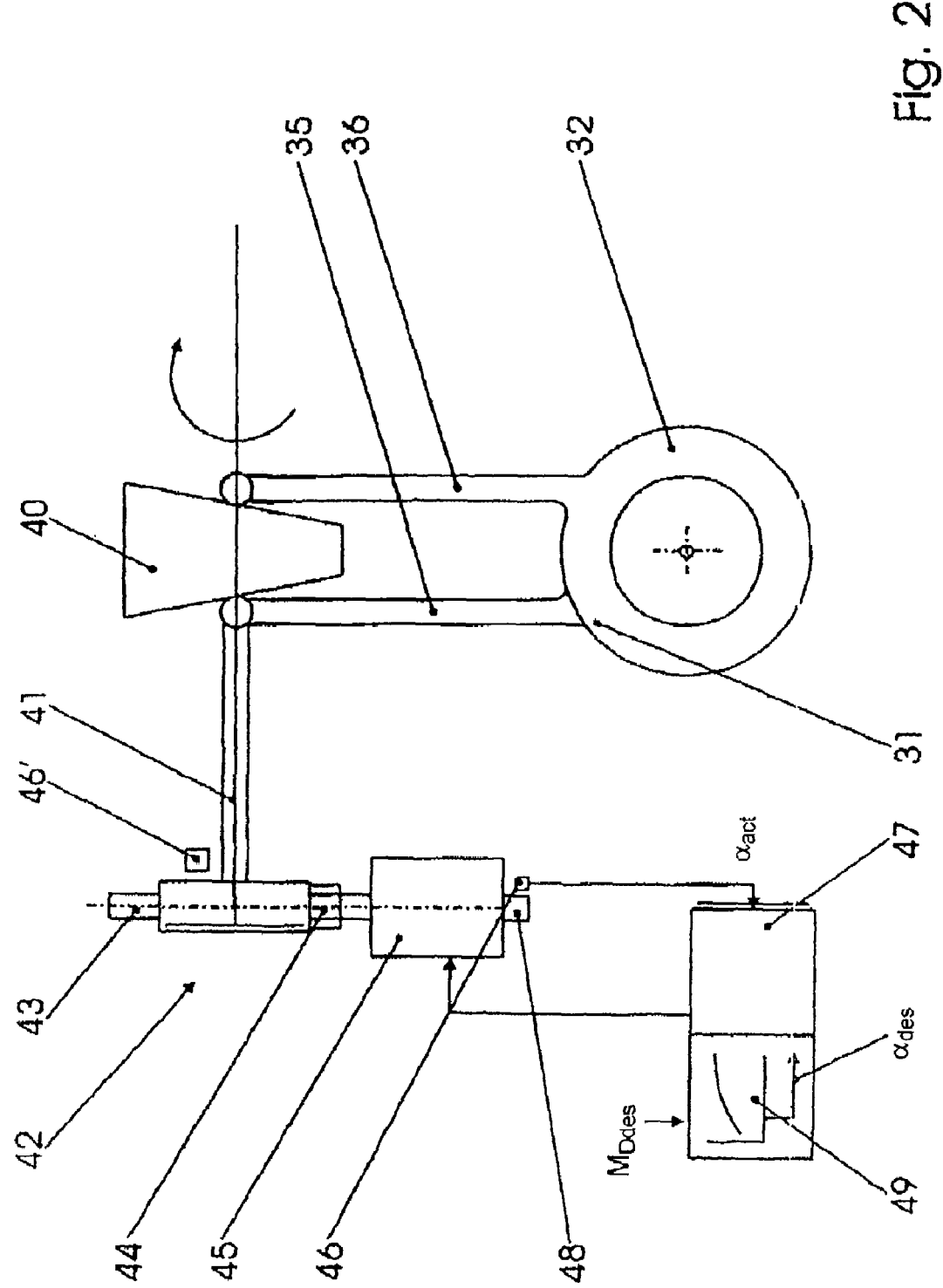
FIG. 2 illustrates a diagram of the device according to the invention.

FIG. 2 diagrammatically illustrates the device according to the invention for setting the torque transmitted by the friction clutch 12, which device acts on the rings 31, 32 which can be rotated relative to each other. The entire actuator chain comprises a controllable electric motor 45 having an armature shaft 48, a step-down gear 42 comprising a worm wheel 43 and a worm 44, and a mechanism for converting the rotating movement of the output shaft 41 of the step-down gear 42 into a translational movement of the pressure plate 29 (FIG. 1).

This mechanism comprises the output shaft 41 with the control disk 40 attached in a rotationally fixed manner on it, and the rings 31, 32 together with their levers 35, 36. The step-down gear 42 is a worm gear with large internal friction typical of such a gear. However, it could also be a different type of gear which is provided, if appropriate, with an additional frictional element. The output shaft 41, the levers 35, 36 and/or parts of the friction clutch 12 itself are elastic. Since they are connected in series, their elasticities add up, with the result that the mechanism overall is flexible. If this is insufficient, then individual elements may be appropriately dimensioned or elastic elements additionally provided.

A sensor 46 is arranged here on the armature shaft 48 of the electric motor 45, said sensor, designed as an incremental transmitter, measuring the angle of rotation of the armature shaft. The sensor 46 may alternatively also be arranged on the output shaft 41 as sensor 46'. It is essential that the predominant part of the elasticity is arranged downstream of it in the force-flow direction. The sensor 46 provides a position regulator 47 with a signal which corresponds here to the angle of rotation ($\alpha_{act}$) of the armature shaft 48. In the position regulator 47, a desired angle of rotation ($\alpha_{des}$) is formed with reference to a characteristic curve 49 from the torque ($Md_{des}$) to be transmitted by the friction clutch, and an activation signal for the electric motor 45 is formed from the difference between ($\alpha_{des}$) and ($\alpha_{act}$).

Figure 3:
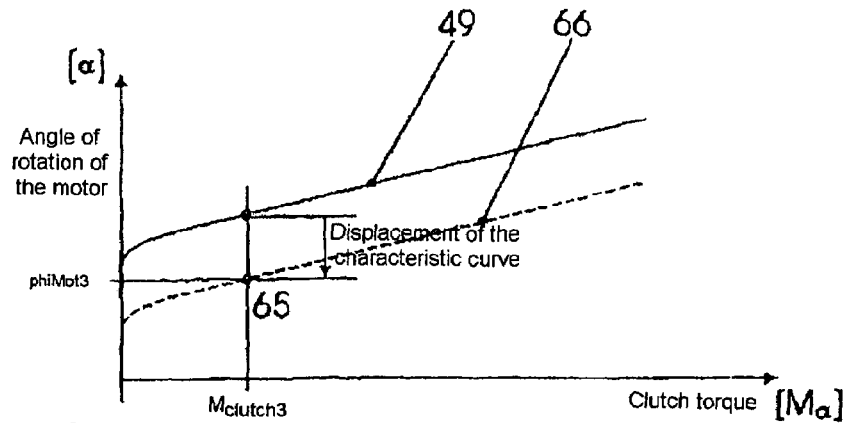
FIG. 3 illustrates the characteristic curve decisive for the control according to the invention.

In FIG. 3, the characteristic curve decisive for the control according to the invention can be seen. The torque to be transmitted by the clutch is plotted on the ordinate, and the corresponding angle of rotation ($\alpha$) of the armature shaft is plotted on the abscissa. It can be seen that the characteristic curve 49 is an unambiguous and continuous curve which can be approximated in part by a straight line.

Figure 4:
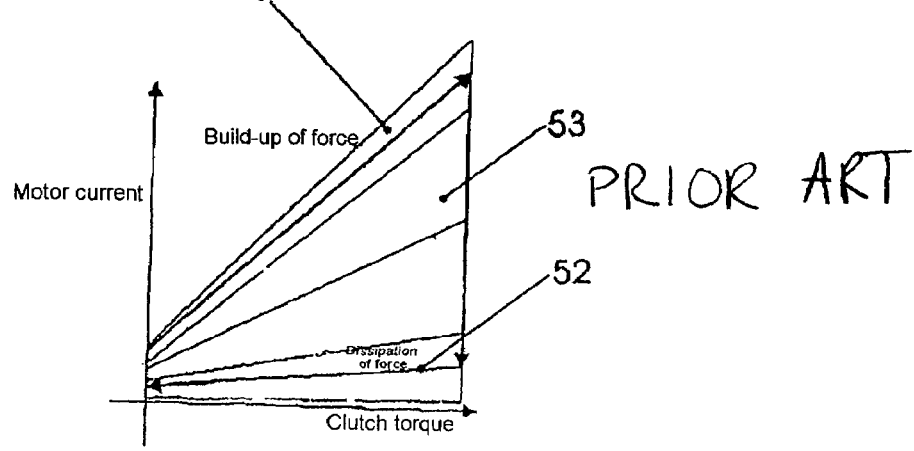
FIG. 4 illustrates a characteristic diagram used according to the prior art.

The characteristic diagram which is depicted in FIG. 4 and is used in accordance with the prior art is in contrast therewith, with the motor current which serves as the actuating variable, i.e. the force exerted by the electric motor, being plotted on the abscissa in it. To increase the torque which is transmitted the characteristic curve 51 applies and to reduce it the characteristic curve 52 applies. The area 53 situated in between corresponds to the friction hysteresis. The characteristic curve 52 has clearly to be situated in the positive quadrant (this is the one illustrated) and has to have a sufficient slope, otherwise a precise setting of the torque is virtually impossible. It can be seen that the characteristic curve 52 is disturbingly parallel to the ordinate and comes close to it.

Figure 5:
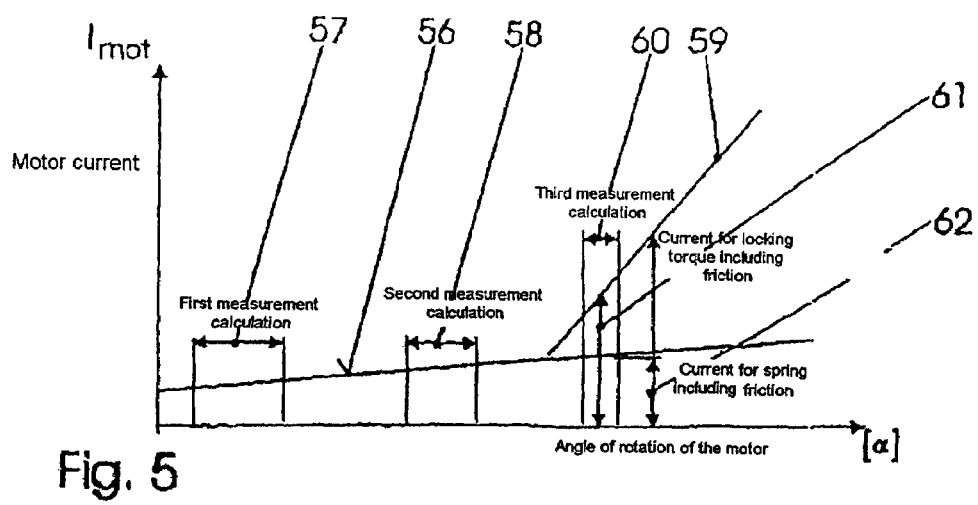
FIG. 5 illustrates a diagram of the calibration of the characteristic curve of FIG. 3.

Turning again to the characteristic curve 49 of FIG. 3, like every characteristic curve, it may differ individually because of manufacturing tolerances and wear of the clutch or may be displaced at a later point, in particular in the direction of the angle of rotation. Every time the clutch is put into operation, but also advantageously later at certain intervals, a calibration of this characteristic curve is therefore required. This calibration or standardization is undertaken as follows:

FIG. 5 shows the calibration diagram. First of all the zero point of the angle of rotation has to be defined. For this purpose, the electric motor is activated in the direction of "releasing the clutch" until a mechanical stop is reached. This position, in which the motor stops despite being fed with current, is defined as the zero point of the angle of rotation. This point corresponds to the X-axis in FIG. 3 and FIG. 5.

The motor is then activated in the direction of "closing the clutch", specifically by means of a motor voltage which reliably suffices in order to build up a small clutch torque. This is illustrated in FIG. 5 as straight line 56. In this case, motor current and angle of rotation are measured, and three calibrating points, motor current and angle of rotation are measured in order to standardize the characteristic curve 49.

In the exemplary embodiment illustrated, the calibrating points are replaced by calibrating intervals 57, 58, 60 in order to obtain particularly high accuracy. The current is integrated over the particular interval (this corresponds to the energy supplied to the system), and the change in the kinetic energy of the actuator chain in the particular interval is then subtracted and divided by the width of the interval. The integration increases the accuracy of the measurement and also eliminates the influence of the irregularity of the motor torque over the angle of rotation.

The two intervals 57 and 58 are situated in the lower region of the angle of rotation, in which only the force of the resetting spring (30 in FIG. 1) has to be overcome and a clutch torque has not yet occurred. In these intervals, a value is determined in each case for the motor current required for overcoming the force of the resetting spring. These values are linked to the straight line 56 which therefore represents the motor current which is required in order to overcome the resetting spring, the spring constant of which is the slope of the straight line 56.

In the third interval 60, in which resetting forces from the friction clutch 12 are also already occurring (straight line 59), the motor current is determined in the above-described manner. It is the motor current 61 which is required in order to overcome the resetting forces and the resetting spring. Subtraction of the current 62 which is required for the resetting spring on its own and is obtained by lengthening the straight line 56 results in the motor current required for the clutch torque which is transmitted. From this motor current, the clutch torque is calculated in the calibrating interval 60 from the difference between the motor currents 61 and 62, multiplied by a known factor, which is constant in favorable cases. This clutch torque and the angle of rotation at which it occurs are now transferred from the diagram of FIG. 5 into the characteristic curve 49 of FIG. 3. This produces the point 65 and, since the slope of the characteristic curve does not change, the corrected characteristic curve 66, shown by dashed lines in FIG. 3.

Owing to the fact that the interval 60 in FIG. 5 is selected at a relatively small clutch torque, errors in the calculation of the clutch torque from the motor current have only a very small effect. The influence of the irregularity of the motor torque over the angle of rotation is also avoided by virtue of the integration over the intervals. Offset errors in the current measurement, tolerances of the resetting spring, basic frictions etc. also have no influence on the accuracy because they are eliminated by the subtraction of the current required only for overcoming the resetting spring.

This calibrating or standardizing method, like the entire control method, may also be used if use is not made of the angle of rotation of the armature shaft or of another shaft, but rather of the position of a different link.

The invention claimed is:

1. A device for setting the torque transmitted by a friction clutch (12), having an actuator chain which comprises an electric motor (45), a step-down gear (42) and a mechanism for converting a rotational movement into a displacement of a pressure plate (29) of the clutch (12), wherein
   a) the electric motor (45) and/or step-down gear (42) is/are affected by friction;
   b) the mechanism (31, 32, 35, 36, 40) for converting the rotational movement into a displacement, and/or the friction clutch (12) is/are provided structurally with elasticity; and
   c) to set the torque (Md) of the friction clutch (12), a position regulator (47) which is operatively connected to the electric motor (45) and a sensor (46; 46') which determines the position of one of the links of the actuator chain (45, 42, 41, 40, 36, 35, 32, 31, 29) are provided,
   d) for which purpose the sensor (46; 46') is arranged at a location which is situated upstream of a substantial part of the elasticity in the force-flow direction.

2. The device as claimed in claim 1, wherein the sensor (46; 46') is arranged on a shaft (41; 48) of the step-down gear (42) or of the electric motor (45).

3. The device as claimed in claim 2, wherein the shaft is an armature shaft (48) and the sensor (46) is an incremental transmitter on the armature shaft (48) of the electric motor (45).

4. The device as claimed in claim 1, wherein the step-down gear (42) is a worm gear.

5. A method for setting the torque (Md) transmitted by a friction clutch (12) by means of an actuator chain (45, 42, 41, 40, 36, 35, 32, 31, 29), comprising an electric motor (45) which brings about via a step-down gear (42) and a mechanism (31, 32, 35, 36, 40) for converting the rotational movement into a displacement of a pressure plate (29) of the clutch, comprising determining a desired position ($\alpha_{des}$) of a link of the actuator chain and setting the torque ($Md_{des}$) to be transmitted by the friction clutch by means of a regulator (47) acting on the electric motor (45).

6. The method as claimed in claim 5, wherein the desired position ($\alpha_{des}$) of a link for a certain torque ($M_{des}$) to be transmitted by the friction clutch (12) is determined with reference to a characteristic curve (49).

7. The method as claimed in claim 5, wherein the desired position of a link is an angle of rotation ($\alpha_{des}$) of a shaft (48; 41) of the electric motor (45) or of the step-down gear (42).

8. The method as claimed in claim 7, wherein the following steps are taken to calibrate the characteristic curve (49):
   activation of the electric motor in the direction of "closing the clutch" until a small torque is transmitted by the friction clutch, measurements of motor current ($I_{mot}$) and angle of rotation of the motor ($\alpha_{act}$) being undertaken at at least two calibrating points (57, 60; 58, 60):
   a first calibrating point (57; 58) is in the venting region of the friction clutch, a second (60) is in a region in which a small torque is transmitted,
   at the second calibrating point (60), the clutch torque is calculated in accordance with a known function from the motor current at the two calibrating points (57, 60; 58, 60),
   the displacement of the characteristic curve (49) follows from the clutch torque and the angle of rotation of the motor at the second calibrating point (60).

9. The method as claimed in claim 8, wherein the calibrating points (57, 58, 60) are calibrating intervals over which the motor current is integrated, the kinetic energy of the actuator chain (45, 42, 41, 40, 36, 35, 32, 31, 29) being subtracted and divided by the width of the particular interval in order to determine the displacement of the characteristic curve (49).

10. The method as claimed in claim 8, wherein the characteristic curve (49) is recalibrated at certain time intervals.

* * * * *